United States Patent [19]

Lafore et al.

[11] Patent Number: 4,891,745
[45] Date of Patent: Jan. 2, 1990

[54] AUTOCONTROL CIRCUIT FOR A RESONANCE UNDULATOR

[75] Inventors: Dominique Lafore, Gemenos; Joël Redoutey, Marseille; Yves Servet, St. Maximin/Ste Baume, all of France

[73] Assignees: Electricite de France: Service National, Paris; Ecole Superieure d'Ingenieurs de Marseille S.A., Marseille; Compagnie Francaise d'Electrothemie Industrielle (CFEI), Seyssinet-Pariset, all of France

[21] Appl. No.: 186,406

[22] Filed: Apr. 26, 1988

[30] Foreign Application Priority Data

Apr. 29, 1987 [FR] France ................. 87 06129

[51] Int. Cl.⁴ .................... H02M 7/521; H02M 7/523
[52] U.S. Cl. ......................................... 363/98; 363/58; 363/132
[58] Field of Search ............... 363/96, 97, 98, 132, 363/55-58

[56] References Cited

U.S. PATENT DOCUMENTS

| 4,591,963 | 5/1986 | Retotar | 363/98 X |
| 4,688,165 | 8/1987 | Pruitt | 363/132 |
| 4,719,558 | 1/1988 | Hanada et al. | 363/98 |

FOREIGN PATENT DOCUMENTS 3313124  7/1984  Fed. Rep. of Germany .
2013424  8/1979  United Kingdom .

Primary Examiner—Patrick R. Salce
Assistant Examiner—Emanuel Todd Voeltz
Attorney, Agent, or Firm—Sughrue, Mion, Zinn, Macpeak & Seas

[57] ABSTRACT

An autocontrol circuit for a resonance current or voltage undulator comprising a power supply, a parallel or series resonant circuit connected to the supply, and circuit elements ($K_1$ to $K_4$) for reversing the polarity of the resonant circuit's connection to the power supply. The power supply comprises a DC voltage generator and an inductive or capacitive element (2). The autocontrol circuit comprises circuit elements for detecting the voltages or currents of both the DC voltage generator and the output of the power supply. Differences between these two measured quantities are related to the load variations of the resonant circuit. The autocontrol circuit also comprises a comparator (11) for determining these differences, and circuit elements to use the comparator's output to produce signals which control switches ($K_1$ to $K_4$) which determine the polarity of the resonant circuit's connection to the power supply.

10 Claims, 3 Drawing Sheets

AUTOCONTROL CIRCUIT FOR A RESONANCE UNDULATOR

The present invention relates to resonance undulators and more particularly to control devices of such undulators.

The development of power semiconductors having high switching speeds permits a rapid development of high-frequency converters operating with resonating loads.

The control of resonance undulators requires a control frequency which is in the neighbourhood of that of the oscillating load circuit whether this be in series or in parallel.

When the load has a variable resonance frequency, the control frequency of the circuit must follow the resonance frequency. This is particularly the case where loads are comprised of induction heating devices.

The solutions employed up to the present time for causing the resonance frequency of the load to be followed by the control frequency of the undulator are based on the use of a regulation loop for the phase and/or the frequency having a phase detector and a voltage controlled frequency oscillator VCO whose overall characteristics are the following:
Specific starting-up conditions and corresponding circuits.
Relatively slow reaction time constants relative to the oscillation periods of the loads.
A frequency variation range limited by the VCO.

An object of the invention is to overcome the drawbacks of known devices by providing an autocontrol circuit for a resonance undulator which is of a relatively simple construction and presents a frequency variation range enabling it to follow the variations of the resonance frequency of the load irrespective of the variation range of the latter.

The invention therefore provides an autocontrol circuit for a resonance undulator, said undulator comprising a power supply, a resonant circuit connected to the supply, and means to reverse the polarity of the connection of the resonant circuit to the supply. The power supply includes a DC voltage generator connected to a storage element. The autocontrol circuit comprises means for detecting the reference voltage or current of the voltage generator, and the voltage across or current flowing out of the power supply. Variations in the voltage or current at the output of the power supply are related to the load variations at the terminals of the resonant circuit. The autocontrol circuit also comprises means for comparing the two detected voltages or currents, and means for producing control signals for reversing the polarity of the connection of the resonant circuit to the power supply, which are a function of the output of this comparison means.

A better understanding of the invention will be had from the following description which is given solely by way of example with reference to the accompanying drawings in which.

Figure 1:
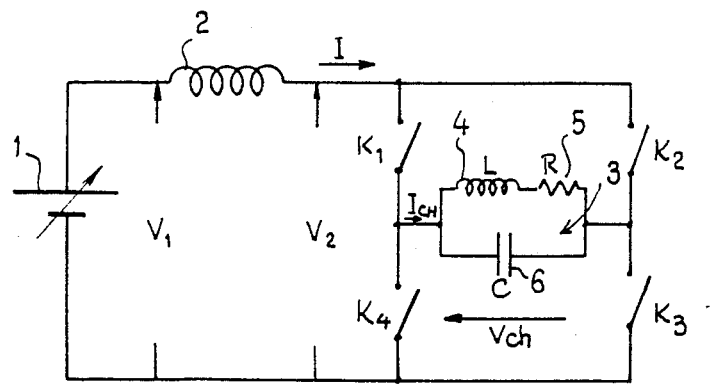
FIG. 1 is a diagram of a circuit which employs the principle of an undulator fed with current.
Figure 2:
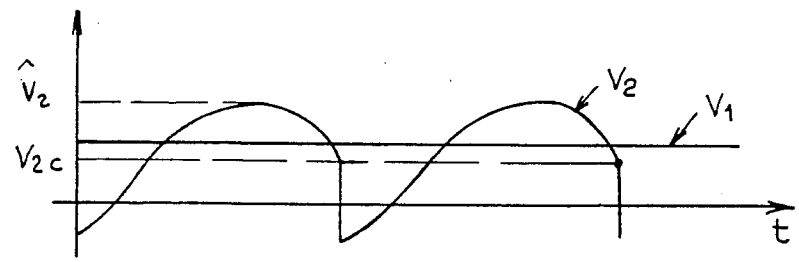
FIG. 2 is a graph representing the variation in the voltages at the terminals of the DC voltage generation and of the load of the undulator of FIG. 1, each plotted as a function of time.

The undulator shown in FIG. 1 essentially comprises a power supply formed by a generator 1 of DC voltage E and an inductor 2.

The power supply formed in this way is connected to the terminals of a resonant load 3 formed by an inductor 4 connected in series with a resistor 5, this combination being connected in parallel with a capacitor 6.

The polarity of the connection of the resonant circuit 3 may be made to the power supply one way by closing switches $K_1$ and $K_3$ and opening switches $K_2$ and $K_4$, or the polarity of the connection may be reversed by closing switches $K_2$ and $K_4$ and opening switches $K_1$ and $K_3$.

The voltage at the terminals of the generator 1 is designated by $V_1$ and constitutes a reference voltage.

The voltage at the output of the power supply is designated by $V_2$.

The current delivered by the supply is designated by I.

The voltage and current at the terminals of the load are designated respectively by $I_{ch}$.

Assuming that the circuit of FIG. 1 is operating in a constant mode, the magnitudes mentioned hereinbefore behave in the following manner:

I is constant.

$V_1$ is a DC voltage.

$V_2$ is a voltage equal to $V_{ch}$ when the switches $K_1$ and $K_3$ are closed, the switches $K_2$ and $K_4$ being open, and to $-V_{ch}$ when the switches $K_2$ and $K_4$ are closed, switches $K_1$ and $K_3$ being open.

Further, the voltages $V_1$ and $V_2$ are equal in mean value.

This equality is expressed by the equation:

$$V_1 (=2/\pi)\widehat{V}_2 \cos \phi \qquad (1)$$

$\phi$ is the phase difference between the current $I_{ch}$ and the voltage $V_{ch}$.

Consequently, with $\cos \phi$ constant, the voltage $V_1$ is proportional to the peak value $\widehat{V}_2$ of the voltage $V_2$.

At the moment of switching the switches $K_1$ through $K_4$, the value $V_{2c}$ of the voltage $V_2$ is given by the equation $$V_{2c} = \widehat{V}_2 \sin \phi \qquad (2)$$

By replacing $\widehat{V}_2$ by the value taken from the equation (1), there is obtained $$V_{2c} = (\pi/2) V_1 \tan \phi \text{ and } \tan \phi = (2/\pi)(V_{2c}/V_1) \qquad (3)$$

If $V_{2c}$ is chosen proportional to $V_1$, which is the case for the given $\phi$, then $V_{2c} = KV_1$, and there will be obtained:

$$\tan \phi = (2/\pi) \times K \qquad (4)$$

Consequently, $\phi$ is independent of the output voltage $V_2$ of the supply and of the frequency f.

Figure 3:
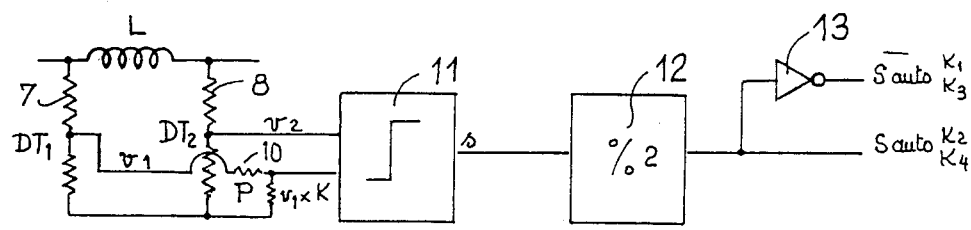
FIG. 3 is a block diagram of the autocontrol circuit according to the invention.

FIG. 3 shows a practical embodiment of an autocontrol circuit employing the sequential switching of the switches $K_1$ to $K_4$ of the undulator shown in FIG. 1.

This circuit comprises, connected on each side of the inductor 2 of the current generator, detectors 7 and 8 each constituted by a voltage divided formed by two resistors in series, the corresponding resistances of each detector being equal.

At the intermediate terminals of the detectors 7 and 8, this arrangement provides voltages $v_1$ and $v_2$ which are the images of the voltages $V_1$ and $V_2$.

Connected in parallel to the resistor of the detector 7 connected to ground is a voltage divider 10 providing a voltage $kv_1$ from the voltage $v_1$ which is the image of the voltage $V_1$ at the terminals of the generator 1.

The outputs of the detector 8 and the voltage divider 10 are connected to the inputs of a comparator 11 adapted to deliver a signal s.

The output, s, of comparator 11 is connected to a circuit 12 which divides the frequency of s by two. Circuit 12 may be implemented, for exaple, by a flip-flop.

The output of the flip-flop 12 constitutes an autocontrol output of the undulator adapted to control the switches $K_2$ and $K_4$.

The inverter 13 connected to the output of the divider 12 provides an output for controlling the switches $K_1$ and $K_3$ by means of a signal which is complementary to that appearing on the output of the flip-flop 12.

Figure 4:
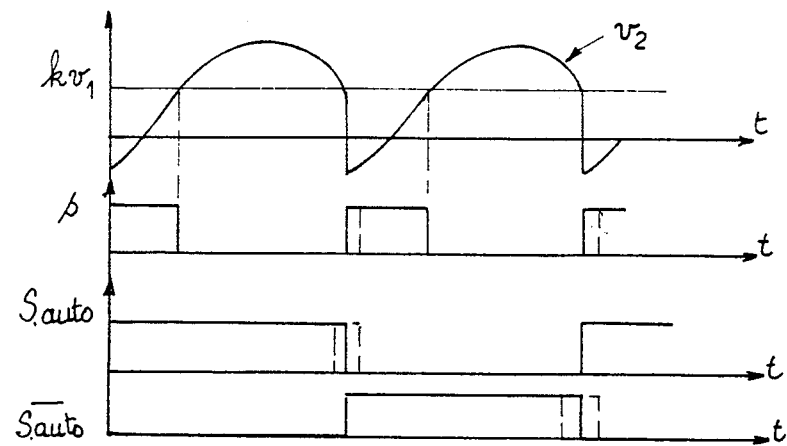
FIG. 4 is a graph of the signals appearing at certain points of the circuit of FIG. 3, plotted as a function of time.

The diagram in FIG. 4 shows the shape of the signals $kv_1$, $v_2$, s, S auto and $\overline{S}$ auto of the autocontrol circuit of FIG. 3.

In one embodiment switches $K_1$ to $K_4$ are comprised of bipolar power MOS transistors.

The operation of the autocontrol circuit represented in FIG. 3 is the following:

The voltage detectors 7 and 8 connected to the terminals of the inductor L of the power supply respectively deliver voltages $v_1$ and $v_2$ which are the images of the voltages $V_1$ and $V_2$ defined hereinbefore.

The comparator 11, whose inputs are the voltage $v_2$ and the voltage $kv_1$ (FIG. 4), compares the signals and outputs a rectangular signal s whose width and period are determined by the instants at which the voltages $kv_1$ and $v_2$ are equal.

The signal s is then divided by the divider 12 whose output, S auto, is fed into inverter 13 to produce the signal $\overline{S}$ auto.

The circuit shown in FIG. 3 therefore permits the variation of the voltage $V_{ch}$ at the terminals of the load to immediately affect the operation of the undulator by comparing the image signals of the undulator's supply voltage with the voltage of the load, and by producing, as a function of this comparison, a modification of the width and period of the signals controlling the switches $K_1$ to $K_4$.

The device according to the invention therefore allows the load itself to automatically control the generation of the undulator's control signals.

This device enables the phase between the current and the voltage delivered by the undulator to remain constant irrespective of the power level fed to the load and the frequency of the load.

The intrinsic response time of the device is a semiperiod of the high frequency of the undulator.

Figure 5:
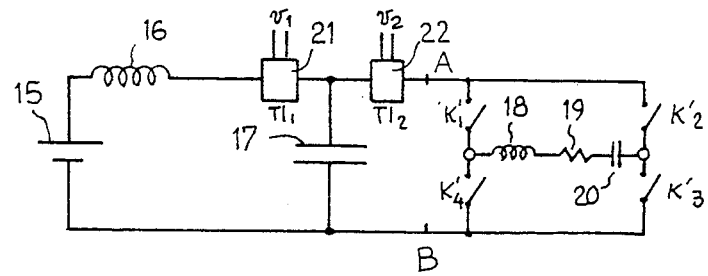
FIG. 5 is a diagram of a circuit which employs the principle of an undulator fed with voltage.

FIG. 5 shows the diagram of an undulator fed with voltage.

It comprises a voltage generator 15 to the terminals of which are connected in series an inductor 16 and a capacitor 17.

Connected to the terminals of the capacitor 17 is a series circuit formed by an inductor 18, a resistor 19 and a capacitor 20 through switches $K'_1$ to $K'_4$ arranged in the same way as the switches $K_1$ to $K_4$ of the circuit of FIG. 1.

A current detector 21 is connected in order to measure the current flowing through the inductor 16. Another current detector 22 is connected in order to measure the current that flows only into the series circuit 18, 19, 20.

The current detectors 21 and 22 may be formed by Hall effect current sensors, shunts or other means.

The voltages $v_1$ and $v_2$ delivered by the detectors 21 and 22 are processed in a circuit identical to that of FIG. 3 so as to obtain signals S auto and $\overline{S}$ auto controlling the switches $K'_2$ and $K'_4$ and $K'_1$ and $K'_3$ respectively.

It should be mentioned that the device according to the invention may operate with a phase lead control when $v_1$ and $v_2$ are of the same sign or with a phase lag when $v_1$ and $v_2$ are of opposite signs.

The device according to the invention delivers the control signals S auto and $\overline{S}$ auto in such a manner that the phase between the current and the supply voltage of the undulator remains constant irrespective of the value of the load, and with a frequency which is controlled by the load itself.

The time constant of the circuit is related to that of the storage element, namely the inductor 2 for the circuit of FIG. 1 and the capacitor 17 for the circuit of FIG. 5.

Figure 6:
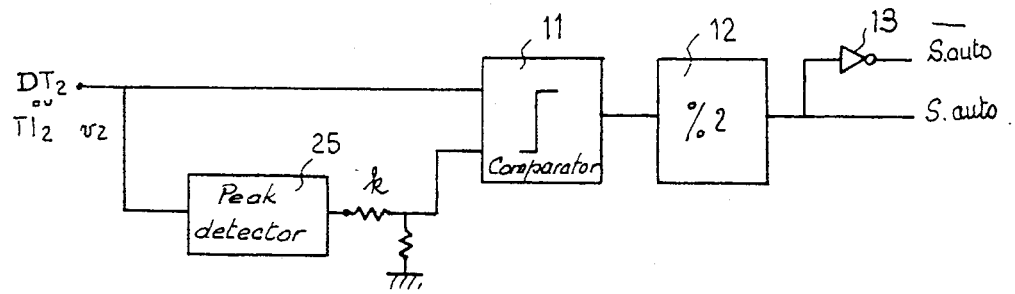
FIG. 6 is a block diagram of a circuit for improving the time constant of an autocontrol undulator according to the invention.

The circuit of FIG. 6 enables this time constant to be improved.

This circuit is similar to that of FIG. 3 and differs therefrom only by the fact that the inputs of the comparator 11, instead of being connected to the outputs of the voltage detectors 7 and 8, are now connected, one to the output of the voltage detector 8 delivering an image of the voltage $V_2$ at the output of the power supply and the other to the output of a peak detector 25 of this voltage $V_2$.

The replacement of the voltage $V_1$ by the peak value of the voltage $V_2$ enables the response time constants to be reduced to that of the peak detector 25.

For a synchronous peak detector a response in a semiperiod of the signal of the undulator may be obtained.

It should be noted that the arrangement of FIG. 6 is just as applicable to an undulator fed with voltages of the type described with reference to FIG. 5.

Figure 7:
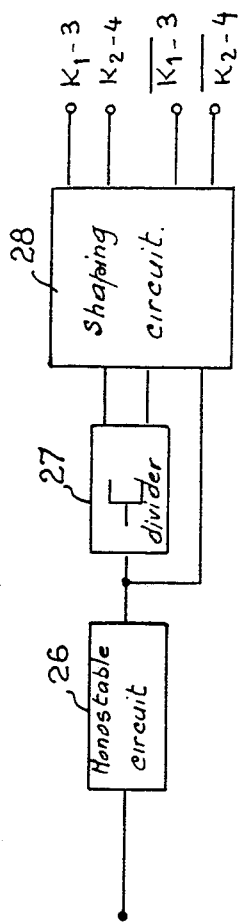
FIG. 7 is a block diagram of an embodiment of a divider dividing by 2 which is part of the construction of the autocontrol circuit according to the invention.

FIG. 7 shows a particular embodiment of a divider which is part of the circuit of FIG. 3, and which generates switching control signals of spaced and overlapped times (as shown in dotted lines in FIG. 4).

The control of the power switches $K_1$ to $K_4$ requires signals which are slightly staggered in time in order to avoid the problems of an open circuit of the current supply or short circuit for the voltage supply at the instants of the switching of the switches.

For this purpose, the circuit of FIG. 7 comprises a monostable circuit 26 whose input is adapted to be connected to the output of the comparator 11 (FIG. 3) and whose output is connected to a divider 27 which divides the frequency of its input by two, producing two outputs each of which is connected to a corresponding input of a shaping circuit 28. The latter comprises an additional input directly connected to the output of the monostable circuit 26.

The shaping circuit 28 comprises four outputs which are the control signals $K_{1-3}$, $K_{2-4}$ and $\overline{K_{1-3}}$ and $\overline{K_{2-4}}$ with appropriate stagger corresponding to the spaced or non-overlapping and overlapping times required for the correct operation of the undulator (see dashed lines in FIG. 4).

The signal applied to the monostable circuit 26 is of frequency 2f so that the output signals of the divider 27 have a frequency equal to the frequency f of the undulator.

Such an arrangement permits achieving the switching with a single spaced/overlapping time generator which avoids the problems of dissymmetry encountered in systems having two spaced time and overlapping time generation circuits used heretofore.

Figure 8:
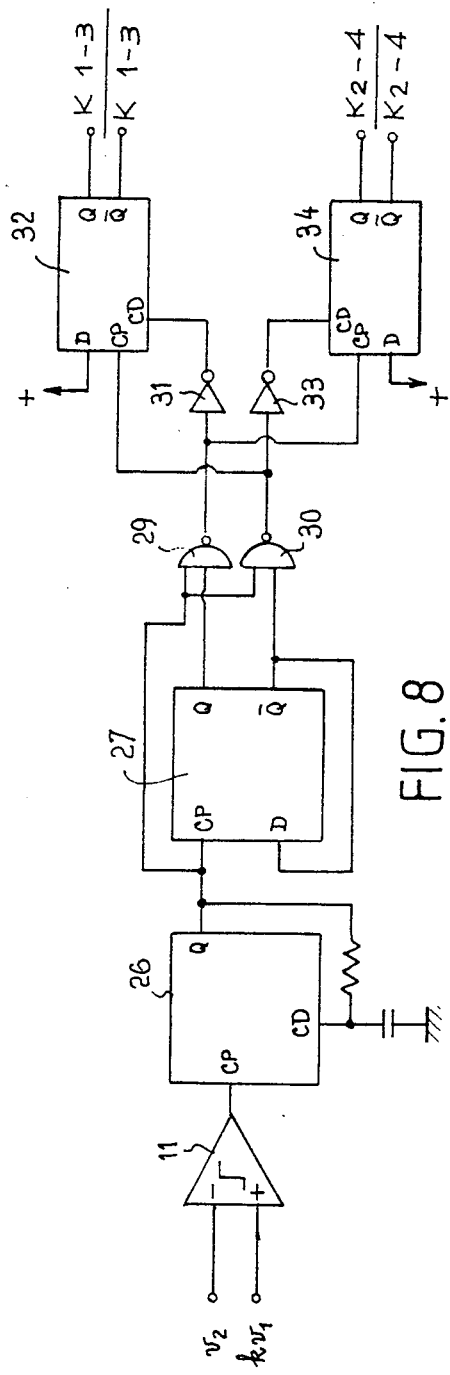
FIG. 8 is a more detailed diagram of an autocontrol circuit having a constant phase with a spaced time and overlapping time generation according to the invention.

FIG. 8 shows an embodiment of an autocontrol circuit with generation of spaced or non-overlapping and overlapping times.

This circuit comprises a comparator 11 for example of type LM311 whose two inputs receive the signals $v_2$ and $kv_1$ obtained in the manner described with reference to FIG. 3.

The output of the comparator is connected to the input CP of a flip-flop D (for example HEF 4013) connected as a monostable circuit 26 whose output Q is connected to the input CP of another circuit 4013 connected as a divider 27 dividing by 2.

The output Q of the divider 27 is one input of an inverting AND gate 29, and the output $\overline{Q}$ of divider 27 is one input of an inverting AND gate 30.

The other inputs of the AND gates 29 and 30 are connected to the output Q of the monostable circuit 26.

The output of the gate 29 is connected through an inverter 31 to the CD input of a D flip-flop (such as HEF 4013) 32 which generates signals with spaced and overlapping times controlling the switches $K_1$ and $K_3$.

The output of the gate 30 is connected through an inverter 33 to the CD input of a D flip-flop (such as HEF 4013) 34 which generates signals with spaced and overlapping times controlling the switches $K_2$ and $K_4$.

The output of the AND gate 29 is also connected to the CP input of the D flip-flop 34 while the output of the AND gate 30 is connected in a similar manner to the CP input of the D flip-flop 32.

The signals $K_{1-3}$ and $\overline{K_{1-3}}$ which control the switches $K_1$ and $K_3$, appear on the outputs Q and $\overline{Q}$ of the circuit 32 while the signals $K_{2-4}$ and $\overline{K_{2-4}}$, controlling the switches $K_2$ and $K_4$ appear on the outputs Q and $\overline{Q}$ of the circuit 34.

The spaced and overlapping times are represented by dashed lines in the graphs of the signals S auto and $\overline{S}$ auto in FIG. 4.

We claim:

1. Autocontrol circuit for a resonance undulator, said undulator comprising a power supply having output terminals, a resonant circuit having input terminals connected to said output terminals of said supply so as to be fed by said supply, and means for reversing the polarity of connection of said resonant circuit to said power supply, said power supply comprising a DC voltage generator and a storage element, said autocontrol circuit comprising means connected to said storage element of said supply for detecting and outputting a first reference value selected from one of voltage and current of said generator, and a second value selected respectively from one of voltage and current at the output of said supply, means for outputting signals produced by comparing said output signals of said detecting means, differences between said first and second values being related to the load variations at said terminals of said resonant circuit, and control means for producing signals for controlling said means for reversing the polarity of said connection of said resonant circuit to said power supply as a function of said output signals of said comparing means.

2. Autocontrol circuit according to claim 1, wherein said power supply storage element is constituted by an inductor, and wherein said means for detecting said values comprises a plurality of voltage detectors connected to said inductor so as to measure voltage across said DC generator and across said output of said supply, said detectors being constituted by a plurality of voltage dividers having a plurality of resistors delivering voltages which are respectively the images of the voltage at said output terminals of said DC voltage generator and of the voltage at said input terminals of said resonant circuit, an additional voltage divider for delivering a voltage equal to the image of the switching voltage of said resonant circuit being interposed between the detector of the voltage at said output terminals of said DC voltage generator and the corresponding input of said comparing means.

3. Autocontol circuit according to claim 1, wherein said power supply storage element is constituted by a capacitor, and wherein said means for detecting said values is in the form of a plurality of current detectors connected to said capacitor so as to measure current through said DC generator and through said output terminals of said supply, said detectors being constituted by means selected from Hall effect current sensors and shunts delivering voltages which are respectively the images of the current delivered by said DC generator and of the current flowing into said resonant circuit, an additional voltage divider for delivering a voltage equal to the image of the current flowing into said resonant circuit at the instant of its switching being interposed between said detector of the current delivered by said DC generator and the corresponding input of said comparing means.

4. Autocontrol circuit according to claim 1, wherein said power supply storage element is constituted by an inductor, and wherein said means for detecting said values comprises a voltage detector connected to said inductor so as to measure voltage across said resonant circuit, said detector being constituted by a voltage divider having a plurality of resistors delivering a voltage which is the image of the voltage at said input terminals of said resonant circuit, and a peak detector whose input is connected to the output of said voltage detector, the signal delivered by said peak detector then being an image of the reference voltage across said DC generator.

5. Autocontrol circuit according to claim 1, wherein said power supply storage element is constituted by a capacitor, and wherein said means for detecting said values comprises a current detector connected to said capacitor so as to measure current flowing through said output terminals of said supply, said detector being constituted by means selected from Hall effect current sensor and shunt delivering a voltage which is the image of the current flowing into said resonant circuit, and a peak detector whose input is connected to the output of said current detector, the signal delivered by said peak detector then being an image of the reference current through said DC generator.

6. Autocontrol circuit according to claim 1, wherein said reversing means have a first part and a second part, said control means for controlling said reversing means comprising a divider having an output which is the signal delivered by said comparing means divided by two, and an inverter connected to the output of said divider, in order to provide at the output of said divider a signal for actuating said first part of said reversing means and a complementary signal for simultaneously actuating said second part of said inverting means.

7. Autocontrol circuit according to claim 1, wherein said reversing means have a first part and a second part, said control means for controlling said reversing means comprising a single monostable circuit having an output and an input which is connected to the output of said comparing means, a divider dividing by two whose input is connected to the output of said monostable circuit and whose output is available in both complemented and noncomplemented forms, and a shaping circuit for shaping signals delivered by said divider and for generating control signals for controlling said reversing means, said shaping circuit ensuring the generation of said control signals with overlapping times.

8. Autocontrol circuit according to claim 1, wherein said reversing means have a first part and a second part, said control means for controlling said reversing means comprising a single monostable circuit having an output and an input which is connected to the output of said comparing means, a divider dividing by two whose input is connected to the output of said monostable circuit and whose output is available in both complemented and noncomplemented forms, and a shaping circuit for shaping signals delivered by said divider and for generating control signals for controlling said reversing means, said shaping circuit ensuring the generation of said control signals with spaced times.

9. Autocontrol circuit according to claim 7, wherein said shaping circuit comprises two inverting AND gates, one gate having an input connected to the noncomplemented output of said divider, the other gate having an input connected to the complemented output of said divider, and both gates having their other inputs directly connected to the output of said monostable circuit, said gates having outputs connected either directly, or through an inverter to two bistable flip-flops having two outputs on which respectively appear the signals controlling said first part of said reversing means with overlapping times and the signals controlling said second part of said reversing means with overlapping times.

10. Autocontrol circuit according to claim 8, wherein said shaping circuit comprises two inverting AND gates, one gate having an input connected to the noncomplemented output of said divider, the other gate having an input connected to the complemented output of said divider, and both gates having their other inputs directly connected to the output of said monostable circuit, said gates having outputs connected either directly, or through an inverter to two bistable flip-flops having two outputs on which respectively appear the signals controlling said first part of said reversing means with spaced times and the signals controlling said second part of said reversing means with spaced times.

* * * * *